FREDERICK J. JACOBY
ROBERT W. SCHRADER
INVENTORS

BY

ATTORNEYS

United States Patent Office 3,627,533
Patented Dec. 14, 1971

3,627,533
FILM BASE SUCH AS POLYESTER BASE HAVING IMPROVED CORE-SET PROPERTIES AND PHOTOGRAPHIC ELEMENTS
Frederick J. Jacoby and Robert W. Schrader, Rochester, N.Y., assignors to Eastman Kodak Company, Rochester, N.Y.
Filed Nov. 21, 1969, Ser. No. 878,789
Int. Cl. G03c 1/80
U.S. Cl. 96—87 R                    9 Claims

ABSTRACT OF THE DISCLOSURE

Film base having improved "core-set" properties and comprising a base layer (made of material having relatively poor "core-set" properties, such as polyesters) coated on at least one side thereof with a thin layer of a cellulose ester is disclosed. Photographic films having a photosensitive layer applied to a film base of this type are also disclosed.

---

The stiffness and creep properties of photographic films affect the tendency of the film to "clockspring" i.e., spring away from the core, when it is wrapped about a spool in conventional photographic film packaging systems. Such "clockspringing" can and often does cause difficulty in loading and unloading roll film cameras and in the smooth and effective operation of film magazines and cartridges. A high tendency to clockspring is the same as a low tendency to "core set" i.e., to set by taking on and maintaining a rolled configuration when unrolled from the spool. Films with an insufficient core set tendency may not perform well in film cartridges or magazines. Films made of polyester, polysulfone, polystyrene and poly(vinyl chloride) and the like have a large number of excellent properties (such as excellent dimensional stability, excellent tear strength, and the like) which make these films extremely desirable for use as film bases for typical roll film applications. However, they have insufficient "core set" tendency to prevent clockspringing.

It is therefore an object of the present invention to provide a film base having substantially improved "core set" tendencies while maintaining many of advantages such as high physical strength and temperature capability which have made poly(ethylene terephthalate), for example, and other polyester materials so popular and reliable in many film base applications.

Figure 1:
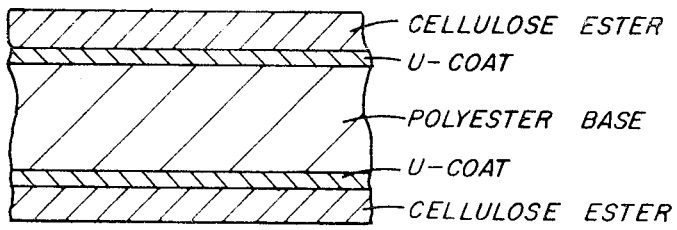
Figure 2:
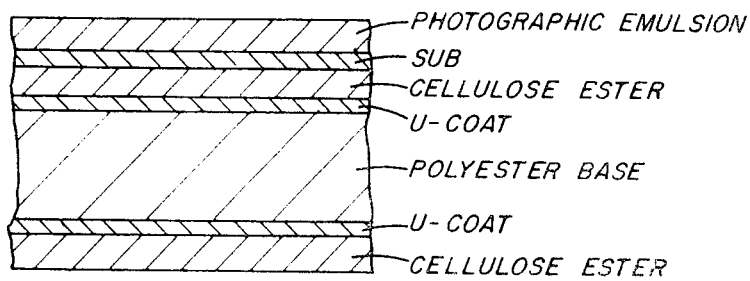

Other objects and advantages of the present invention will become obvious to those skilled in the art in view of the following description when considered in combination with the accompanying drawings of which:

FIG. 1 is a cross-sectional view of one preferred embodiment of the film base of the instant invention; and FIG. 2 is a cross-sectional view of a preferred embodiment of a photographic film element of the present invention.

Generally, according to this invention there is provided a photographic film base comprising (1) a core of a material having insufficient core-set to prevent clockspringing and (2) a coating on at least one side of the core consisting essentially of a cellulose lower fatty acid ester such as cellulose acetate.

It has been discovered that, apparently, the desirable "core set" tendencies of a small amount of cellulose ester film are surprisingly of sufficient magnitude to enhance the lower core set tendencies exhibited by many other films made of polymeric materials.

The desirable core-setting properties of cellulose lower fatty acid esters and in particular cellulose acetate film bases are apparently due to their high creep. In addition, these cellulose esters possess the ability to absorb moisture from the air or other medium into which they are placed. This ability gives them a further advantage in addition to their superior performance in roll, cartridge or cassette applications in that they readily flatten out and are uncurled when placed in developer baths; an advantage which is grossly lacking in the aforementioned films of polyester and other polymers.

Poly(ethylene terephthalate) and other polyesters commonly used as film bases absorb practically no moisture. Hence, their core set properties cannot be controlled or varied to any significant degree in the desired manner that these properties are controlled in the aforementioned cellulose ester materials, i.e., the core setting properties of the film base should be such that the film can be "set" in the rolled condition, but should be able to be readily converted from such a curled or rolled configuration to a flat condition while undergoing subsequent processing.

Surprisingly, it has been discovered that the application of a thin layer of a suitable cellulose ester to at least one side of a layer of a film base material, which exhibits insufficient "core set" characteristics to prevent clockspringing, provides a laminated film base product possessing substantially all of the advantages of both the cellulose ester layer and the stiffer "core" layer including the superior physical properties provided by the desirable polyester photographic film base supports, for example, while combining therewith a desirable quanta of core setting tendencies.

Thus, a preferred embodiment of this invention consists of a thin layer of a cellulose ester (preferably of cellulose acetate) laminated to at least one side of a polyester film base material [preferably poly(ethylene terephthalate)].

As shown in FIG. 1, the film base of a preferred embodiment of the present invention comprises a core or base of the polyester sheet having coated upon both sides thereof a thin layer of cellulose ester such as cellulose acetate, a thin U-coat being applied between the polyester base and the cellulose ester layer to insure superior adhesion between the otherwise contiguous layers.

Depending upon the cellulose ester applied to the base film, the U-coat may be dispensed with entirely and its presence or absence in no way forms a critical part of the instant invention. Among the U-coat compositions which have been found useful when the base film is polyester, and cellulose ester materials enumerated below are used, are poly(vinylidene chloride) copolymers which are particularly useful when cellulose triacetate is applied as the coating layer over a base film of poly(ethylene terephthalate). Other convention U-coat materials useful in improving the adhesion of relatively more hydrophilic materials to the relatively hydrophobic polyester "core" can also be used.

Similarly, depending upon the "core-set" character of the polyester film base material, and the degree of improvement therein which it is desired to impart thereto, either a single layer of the cellulose ester applied to one side thereof or a layer applied to each side of the "core" (as shown in FIG. 1) can be used.

Among the preferred materials which can be used for the base or "core" material are the poly(ethylene terephthalate), poly(cyclohexylene dimethylene terephthalate), and copolymers thereof having intrinsic viscosities of at least about 0.5 (measured at 25° C. in a 60:40 phenol: chlorobenzene solvent system) and "core set" values below about 170 when measured according to the method detailed in Example 1, as well as polycarbonates, and other poor "core set" materials such as poly sulfones and polyvinylchlorides.

The cellulose esters which are suitable for application to the above described film base materials include those cellulose acetates and mixed lower fatty acid esters of cellulose including cellulose acetate butyrate and cellulose acetate propionate that are conventionally useful as photographic film base materials, per se.

The thickness of the "core" layer and the cellulose esters layer(s) applied thereto are not critical to the successful practice of the instant invention provided reasonable thickness which provide useful film materials are utlized. Generally, in roll film applications the maximum composite thickness of the entire film base structure including the polyester base and one or two applied cellulose ester layers should not exceed about 10 mils. Preferably they should be at most about 5 mils thick. This thickness provides sufficient pliability for roll film needs while relatively thickner films are too stiff for such applications. The relative thickness of the respective "core" and "coating" layers of the film base products of this invention may vary greatly depending upon the degree of "core set" sought to be imparted to the resulting product and the level of the advantageous characteristics of the "core" layer (such as modulus, heat strength, etc.) which is sought to retain. As a general rule when it is desired to use only a single layer of the cellulose ester applied to the "core" layer, the thickness of the "core" layer should range from about 0.5 up to about 9 mils, and represent at least about 40 percent of the total combined thickness of the polyester+cellulose ester layers, and the cellulose ester layer should range from about 0.25 up to about 4 mils.

In the case where two layers of the cellulose ester are applied, one to either side of the polyester base, the thickness of the base may range within the limits described above and the individual cellulose ester layers should range from about 0.125 to about 3.5 mils in thickness with both layers of the same or different thicknesses.

In the preferred embodiment of the invention depicted in FIG. 1 the polyester core layer ranges in thickness from about 1 to about 4 mils and the two individual cellulose ester layers each can range in thickness from about 0.25 to about 1.5 mils.

Application of the cellulose ester layer to the polyester base may be accomplished using any of a number of conventional techniques which are used to "stick" different types of polymer layers together, including simultaneous extrusion of the polyesters base and cellulose ester layer or layers, casting of the cellulose ester onto the polyester from a dope either with or without the previous application of a suitable U-coat but preferably with the previous application to the "core" material of a conventional "sub" or U-coat.

It is, of course, the ultimate aim of this invention to provide an improved photosensitive film product such as that shown in FIG. 2. As shown therein, the preferred film comprises a polyester base having a layer of the cellulose ester coated on both sides thereof, an intermediate U-coat layer being applied therebetween to insure proper and permanent adhesion of the layers. In this embodiment, one of the cellulose ester layers has a layer of a photosensitive material coated thereon. The type of emulsion or other photosensitive layer which is applied to the surface of, in this instance the trilaminate structure, may be of a conventional gelatin type or of any other type which is compatible with the cellulose ester layer. If desired conventional subbing layers which increase or decrease the hydrophobic or hydrophylic characteristics of the base can be introduced between the cellulose ester layer and the layer of photosensitive materials in a conventional fashion.

In the case where a single layer of the cellulose ester is applied to the polyester base, the photosensitive material can be applied either directly or through the use of an intermediate U-coat or subbing layers to either the polyester or cellulose ester surface of the composite film base structure with only minimal or actually negligible effect upon the core-set properties of the film base being experienced.

As should be clear, from the above discussion, the degree of "core-set" which is to be imparted to any particular base material can be varied, depending upon the thickness of the base by varying the thickness and number of cellulose ester layers which are applied thereto. Experimentation in this regard as demonstrated by the examples below can quickly indicate the composition or construction of a product having optimum core-set characteristics for a particular film application such as for use in cartridges, rolls or cassettes.

The following examples, the results of which are set forth in Table I, will better serve to demonstrate advantageous characteristics of the film base materials of the instant invention.

EXAMPLE 1

A 4.0 mil thick sheet of poly(ethylene terephthalate) of the type conventionally used in film base applications is rolled on a ½ inch diameter core and stored there for one month prior to unwinding. Measurements made at 70° F. and 50% relative humidity one minute after unwinding exhibited a core-set in units of 100/R equal to 90, where R is measured in inches. A minimum "core-set" value of about 200 in this test is considered necessary to prevent clockspringing. Note that those polymeric materials that are useful as "core" materials for the film bases of the present invention have "core set" values via this test below 170.

EXAMPLES 2 and 3

In these examples trilaminate film bases comprising different thicknesses of the poly(ethylene terephthalate) base layer having varying thicknesses of the cellulose triacetate applied to both sides thereof by casting from a conventional dope used to cast cellulose triacetate film base are evaluated as described in Example 1. The results are shown in Table I.

EXAMPLE 4

A film of the cellulose triaectate material applied to the poly(ethylene terephthalate) core or base layer in Examples 2 and 3 and of the same order of thickness as the composite trilaminates of those examples is treated and its core set measured as described in Example 1. The results of this test are also shown in Table I.

TABLE I

| Example | Poly(ethylene terephthalate) | Thickness, mils, cellulose triacetate | | | Core set, ASA units 100/R in.⁻¹ |
| --- | --- | --- | --- | --- | --- |
| | | Layer 1 | Layer 2 | Total | |
| 1 | 4.0 | --- | --- | 4.0 | 90 |
| 2 | 2.5 | 0.5 | 0.5 | 3.5 | 195 |
| 3 | 1.5 | 1 | 1 | 3.5 | 240 |
| 4 | | 3.6 | | 3.6 | 260 |

As should be clear from the above Table I, the 4 mil thick poly(ethylene terephthalate) film base material when rolled and unrolled as described above exhibited insufficient core set to prevent clockspringing. The addition of two 0.5 mil thick cellulose triacetate layers on either side of a 2.5 mil thick poly(ethylene terephthalate) base to provide a composite trilaminate sheet 3.5 mils thickness, i.e., on the same order of thickness as the previously tested poly(ethylene terephthalate) film, surprisingly, produces a significantly higher core set, the resulting product being at about the minimum acceptable "200" level, while other properties of the polyester "core" remain substantially uneffected. The addition of two 1 mil cellulose triacetate layers to a 1.5 mil poly(ethylene terephthalate) base as shown in Example 3 resulted in a "core set" approaching that achieved when in Example 4 a 3.6 mil film of cellulose triacetate was treated and measured as described above.

In this instance, too, the "core" of poly(ethylene terephthalate) exercises a strong dominance over the physical characteristics of the resulting laminate film structure. It is believed surprising that the presence of such a relatively small amount of cellulose acetate material (only 57% of the thickness of the film structure in Example 3 is cellulose acetate) can be used to obtain substantially the same "core set" values in the resulting structure as can be obtained by the use of pure cellulose acetate film, while retaining in the film structures of this invention at least a very large proportion of the desirable properties of the core material (which properties are not available in conventional cellulose ester films).

Thus, it is clear that the addition of a layer or layers of a high core-set cellulose ester to one or both sides of a polyester film base will produce a composite film base whose core set can be varied to meet a variety of requirements and which by reducing the thickness of the polyester base and increasing the thickness of the cellulose ester overlayer or layers can be designed to have a core set approaching that of the purely cellulose ester film while maintaining a constant overall or composite thickness for the film base.

The invention has been described in detail with particular reference to preferred embodiments thereof, but it will be understood that variations and modifications can be effected within the spirit and scope of the invention as described hereinabove.

What is claimed is:

1. A film base having improved core set properties; said film base comprising (a) a core layer of a polymer having a core set value of at most about 170, (b) a thin layer of a lower fatty acid ester of cellulose coated on each side of said core layer, and (c) a sub layer to insure adhesion between said core layer and said thin layer; said core layer having a thickness equal to at least about 40 percent of the thickness of said film base and each of said thin layers of lower fatty acid ester of cellulose having a thickness of at least about 0.125 mil, 2. A film base as in claim 1, wherein said core layer consists of a polymer selected from the group consisting of polyesters, polycarbonates, polysulfones and poly(vinylchlorides).

3. A film base in claim 2, wherein said lower fatty acid ester of cellulose is selected from the group consisting of cellulose acetates, cellulose acetate butyrate and cellulose acetate propionates.

4. A film base as in claim 3, wherein said core layer consists of a polyester selected from the group consisting of poly(ethylene terephthalate), poly(1,4 - cyclohexylenedimethylene terephthalate), and copolymers thereof.

5. A film base as in claim 4, wherein the thickness of said core layer is from about 0.5 to about 9 mils and the thickness of each of said thin layers of lower fatty acid ester of cellulose is from about 0.25 to about 4 mils.

6. A film base as in claim 4, wherein the thickness of said core layer is from about 1 to about 4 mils, and the thickness of each of said thin layers of lower fatty acid ester of cellulose is from about 0.25 to about 1.5 mils.

7. A film base as in claim 6, wherein said polyester is poly(ethylene terephthalate) and said lower fatty acid ester of cellulose is cellulose triacetate.

8. A film base as in claim 1, wherein a layer of photosensitive emulsion is coated over said thin layer of lower fatty acid ester of cellulose.

9. A film base as in claim 7, wherein a layer of photosensitive emulsion is coated over one of said layers of cellulose triacetate.

References Cited
UNITED STATES PATENTS

| | | | |
|---|---|---|---|
| 3,495,984 | 2/1970 | Vanpoecke et al. | 96—87 |
| 3,222,174 | 12/1965 | Rott et al. | 96—87 XR |
| 3,117,046 | 1/1964 | Klockgether et al. | 96—87 XR |

RONALD H. SMITH, Primary Examiner

U.S. Cl. X.R.

117—86, 138.8 A, 138.8 F, 166